(12) United States Patent
Murdock et al.

(10) Patent No.: US 11,656,922 B2
(45) Date of Patent: May 23, 2023

(54) PERSONALIZED NOTIFICATION BROKERING

(71) Applicant: MICROSOFT TECHNOLOGY LICENSING, LLC, Redmond, WA (US)

(72) Inventors: Vanessa Murdock, Seattle, WA (US); Lee Dicks Clark, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/258,834

(22) Filed: Jan. 28, 2019

(65) Prior Publication Data
US 2019/0235936 A1    Aug. 1, 2019

Related U.S. Application Data

(60) Provisional application No. 62/623,301, filed on Jan. 29, 2018.

(51) Int. Cl.
| | |
|---|---|
| *G06F 7/06* | (2006.01) |
| *G06F 9/54* | (2006.01) |
| *G06N 20/00* | (2019.01) |
| *G06F 16/2457* | (2019.01) |
| *G06K 9/62* | (2022.01) |
| *H04W 68/02* | (2009.01) |

(52) U.S. Cl.
CPC ........ *G06F 9/542* (2013.01); *G06F 16/24578* (2019.01); *G06K 9/6265* (2013.01); *G06N 20/00* (2019.01); *H04W 68/02* (2013.01)

(58) Field of Classification Search
CPC ... G06F 9/542; G06F 16/24578; G06N 20/00; G06K 9/6265; H04W 68/02
See application file for complete search history.

(56) References Cited

U.S. PATENT DOCUMENTS

| | | | |
|---|---|---|---|
| 8,738,723 B1 * | 5/2014 | Faaborg | G06F 3/0481 709/207 |
| 2016/0055499 A1 * | 2/2016 | Hawkins | G06Q 30/0204 705/7.33 |

(Continued)

OTHER PUBLICATIONS

"International Search Report and Written Opinion Issued in PCT Application No. PCT/US2019/015636", dated Apr. 18, 2019, 10 Pages.

*Primary Examiner* — Charles E Anya
*Assistant Examiner* — Abdou K Seye
(74) *Attorney, Agent, or Firm* — Shook, Hardy & Bacon, LLP

(57) ABSTRACT

Aspects of the technology described herein are directed towards systems, methods, and computer storage media for, among other things, providing personalized notification management. Notifications can be communicated to a user upon receipt or queued for subsequent handling based on a probability that the user will interact with the notification within a threshold elapsed time from presentation, if it is presented. The probability is determined based on a user's past interactions with similar notifications. The interactions of other users with notifications can also be considered to determine the probability. The notifications can be managed by a notification broker.

19 Claims, 7 Drawing Sheets

(56) References Cited

U.S. PATENT DOCUMENTS

| | | | |
|---|---|---|---|
| 2016/0170991 A1* | 6/2016 | Birchall | G06F 16/24578 |
| | | | 707/751 |
| 2016/0173631 A1 | 6/2016 | Mckay et al. | |
| 2016/0248865 A1* | 8/2016 | Dotan-Cohen | G06Q 10/109 |
| 2016/0249319 A1 | 8/2016 | Dotan-cohen et al. | |
| 2017/0316320 A1 | 11/2017 | Jamjoom et al. | |
| 2018/0332211 A1* | 11/2018 | Chaudhri | G06V 20/35 |

* cited by examiner

PERSONALIZED NOTIFICATION BROKERING

CROSS REFERENCE TO RELATED APPLICATIONS

This application claims the benefit of U.S. Provisional Application No. 62/623,301, filed Jan. 29, 2018, the entirety of which is hereby incorporated by reference.

BACKGROUND

Sometimes it is inconvenient for a person to receive notifications. For example, a user may receive a notification of a missed call when it is inconvenient for the user to return the call and in so doing dismiss the notification. Later, when it is convenient, the user does not remember to respond because the notification was dismissed. Moreover, because some notifications are more urgent than others, a user may desire to be notified sooner because of their importance, even when it is not as convenient to respond.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed towards systems, methods, and computer storage media for, among other things, providing personalized notification management. Notifications can be communicated to a user upon receipt or queued for subsequent handling based on a probability that the user will interact with the notification within a threshold elapsed time from presentation, if it is presented. The probability is determined based on a user's past interactions with similar notifications. The interactions of other users with notifications can also be considered to determine the probability. The notifications can be managed by a notification broker.

A notification broker is a gatekeeper for notifications originating at multiple sources, such as applications, operating system, or services. The notification broker receives notifications, evaluates them, and then takes action on the notifications. Actions can include holding the notification, deleting the notification, and presenting the notification. A notification broker may not handle all notification functions on a device. Some applications on a device may be able to generate and output notifications without going through the notification broker.

Notifications and user interactions with those notifications may be determined by monitoring the user data, and from this, notification interaction patterns may be determined. Contextual information about the notification may also be determined from the user data or patterns determined from it, and may be used to determine a probability of interacting with a notification in certain contexts. In some aspects, contextual information may also be determined from user data of other users (i.e., crowdsourcing data). In such aspects, the data may be de-identified or otherwise used in a manner to preserve the privacy of the other users.

Additionally, the user's probability of interacting with a notification may be predicted based on the determined user patterns and/or user data sensed from one or more user devices associated with the user (such as a smartphone) and in some instances from devices associated with other users. For example, user data, such as location, time, online activity, calendar(s), or any number of other user data, may be collected and used to determine user-availability patterns for different types of activities related to interacting with a notification, how that user typically responds to certain events, as well as how other users typically respond.

BRIEF DESCRIPTION OF THE DRAWINGS

Aspects of the invention are described in detail below with reference to the attached drawing figures, wherein.

DETAILED DESCRIPTION

Figure 1:
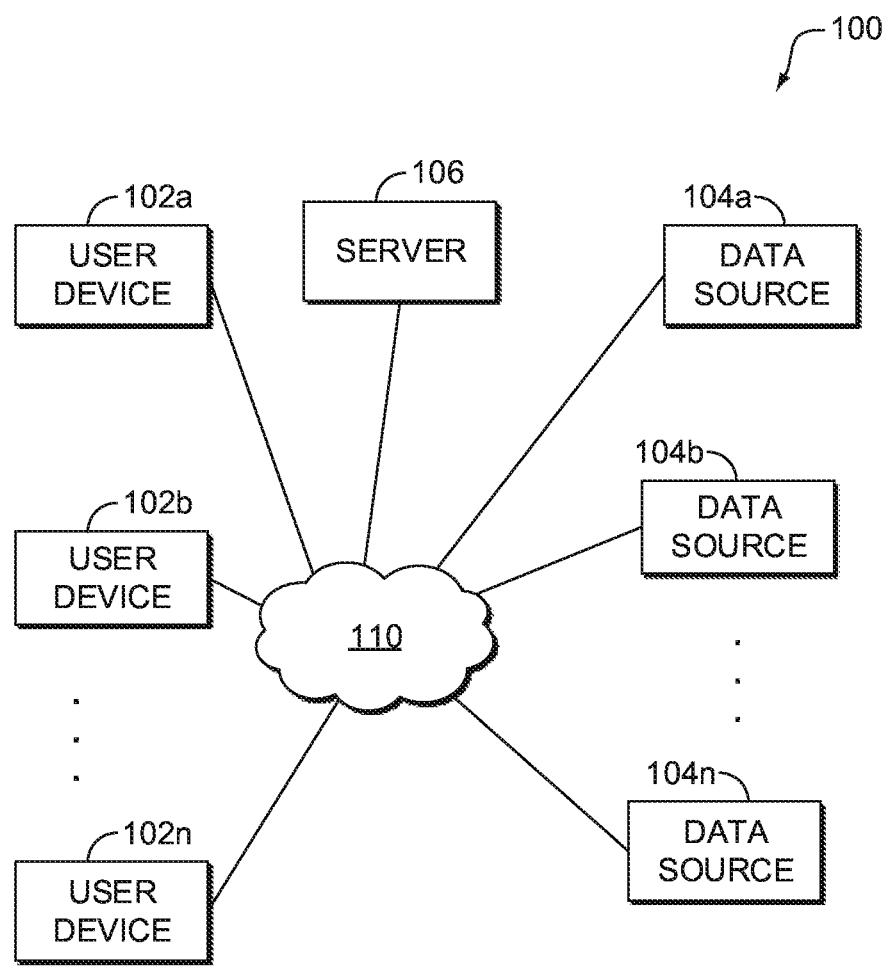
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, providing personalized notification management. Notifications can be communicated to a user upon receipt or queued for subsequent handling based on a probability that the user will interact with the notification within a threshold elapsed time from presentation, if it is presented. The probability is determined based on a user's past interactions with similar notifications. The interactions of other users with notifications can also be considered to determine the probability. The notifications can be managed by a notification broker.

Aspects of the technology described herein are directed towards, among other things, improving how a computer communicates notifications to a user. Providing notifications is a function of a computer's user-computer interface. The interface can be a graphical-user interface, audio-user interface, or take some other type, such as haptic. The present invention improves the user-interface by better understanding and utilizing implicit user input signals that indicate whether a user will interact with a given notification at a given point in time.

Conventionally, a computer can manage notifications through manual instructions provided by a user. For example, a user can manually set if and when an audible sound will alert the user that an e-mail or text has been received. However, these settings are not very granular and do not consider real-time user signals. For example, a user's manual settings may indicate that a user is available for notifications between 7:00 AM and 11:00 PM. In reality, the user's ability to respond to a notification during this time will vary. For example, the user may not be able to respond to a notification while in a meeting. The current notification management processes do not take the user's activities into account.

The result of currently available technology is a very inefficient notification process that provides notifications at inopportune times when the user is not likely to interact with the notification. These notifications are then forgotten resulting in a bad user experience. In other situations, the computing device needs to repeat notifications that are not interacted with, resulting inefficient use of computer resources. Presenting notifications only when the user is likely to interact with the notification creates a better user experience and reduces duplicate notification efforts.

Aspects of the technology described herein provide improvements in how a computer manages the communication of a notification to a user by automatically accelerating or queuing the communication of a notification by predicting whether the user will interact with the notification. For example, if it is predicted that a user will respond to a received e-mail, the notification (e.g., the audible sound indicating that an e-mail has arrived) will be communicated to the user upon receipt of the e-mail. Thus, the computer's communication of a notification to a user is improved because a notification likely to elicit a user response is communicated to the user faster than a notification predicted not to cause a user interaction.

A notification broker is a gatekeeper for notifications originating at multiple sources, such as applications, operating system, or services. The notification broker receives notifications, evaluates them, and then takes action on the notifications. Actions can include holding the notification, deleting the notification, and presenting the notification. A notification broker may not handle all notification functions on a device. Some applications on a device may be able to generate and output notifications without going through the notification broker.

The term "notification event" is used broadly herein to include actions taken (or not taken) by a user, application, or device in association with an electronic notification. The notification can be audible, visible, haptic (e.g., vibration), or a combination of these and other communication channels. Notification refers to nearly any notification received or initiated by a computing device associated with a user including attempted notifications (e.g., missed calls), notifications intended for the user, initiated on behalf of the user (e.g., task reminder), or available for the user. The notification may be for a reminder, task, announcement, or news item (including news relevant to the user such as local or regional news, weather, traffic, or social networking/social media information). Thus, by way of example and not limitation, notification events can be related to efforts to make the user aware of communications, including voice/video calls; email; SMS text messages; instant messages; notifications; social media or social networking news items or communications (e.g., tweets, Facebook posts or "likes," invitations, news feed items); news items relevant to the user; tasks that a user might address or respond to; RSS feed items; website and/or blog posts, comments, or updates; calendar events, reminders, or notifications; meeting requests or invitations; in-application communications including game notifications and messages, including those from other players; or the like. Some notification events may be associated with an entity (such as a contact or business, including in some instances the user himself or herself) or with a class of entities (such as close friends, work colleagues, boss, family, business establishments visited by the user, etc.). The notification can be associated with an entity through content of the notification. For example, a notification that an email has been received can be associated with the sender of the email as well as co-recipients of the email. The notifications can also be from applications and system functions, for example, letting the user know an update is available.

An "ignored notification" may refer to a notification that a user has not interacted with, responded to, handled, or otherwise addressed, such as a missed or uninitiated call, an unresponded-to email, unacknowledged notification or reminder, unaddressed task, unaddressed request, unaddressed social media item (e.g., a tag, tweet, newsfeed post, or similar occurrence relevant to the user), etc. Interacting with notification events can correspond to one or more user responses or activities associated with addressing the reason for the notification, such as completing or returning a call, completing a task, drafting an email, acknowledging a new item notification or social media post, scheduling an appointment, or purchasing an anniversary present, for example. By identifying unaddressed events, content such as service content can be provided to users based on the context of the unaddressed event and user behavior so as to tailor or personalize the content for the user.

Accordingly, at a high level, in one aspect, user data is received from one or more data sources. The user data may be received by collecting user data with one or more sensors on user device(s) associated with a user, such as described herein. Examples of user data, which is further described in connection to component 214 of FIG. 2, may include location information of the user's mobile device(s), user-activity information (e.g., app usage, online activity, searches, calls), application data, contacts data, calendar and social network data, or nearly any other source of user data that may be sensed or determined by a user device or other computing device.

Notifications and user interactions with those notifications may be determined by monitoring the user data, and from this, notification interaction patterns may be determined. Contextual information about the notification may also be determined from the user data or patterns determined from it, and may be used to determine a probability of interacting with a notification in certain contexts. In some aspects, contextual information may also be determined from user data of other users (i.e., crowdsourcing data). In such aspects, the data may be de-identified or otherwise used in a manner to preserve the privacy of the other users.

Additionally, the user's probability of interacting with a notification may be predicted based on the determined user patterns and/or user data sensed from one or more user devices associated with the user (such as a smartphone) and in some instances from devices associated with other users. For example, user data, such as location, time, online activity, calendar(s), or any number of other user data, may be collected and used to determine user-availability patterns for different types of activities related to interacting with a notification, how that user typically responds to certain events, as well as how other users typically respond.

Additionally, some aspects of the technology may be carried out by a personal assistant application or service, which may be implemented as one or more computer applications, services, or routines, such as an app running on a mobile device or in the cloud, as further described herein.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 700, described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprises one or more sensors, which may be integrated into or associated with one or more of the user device(s) 102a, 102b, or 102n or server 106. Examples of sensed user data made available by data sources 104a through 104n are described further in connection to user-data collection component 214 of FIG. 2

Figure 2:
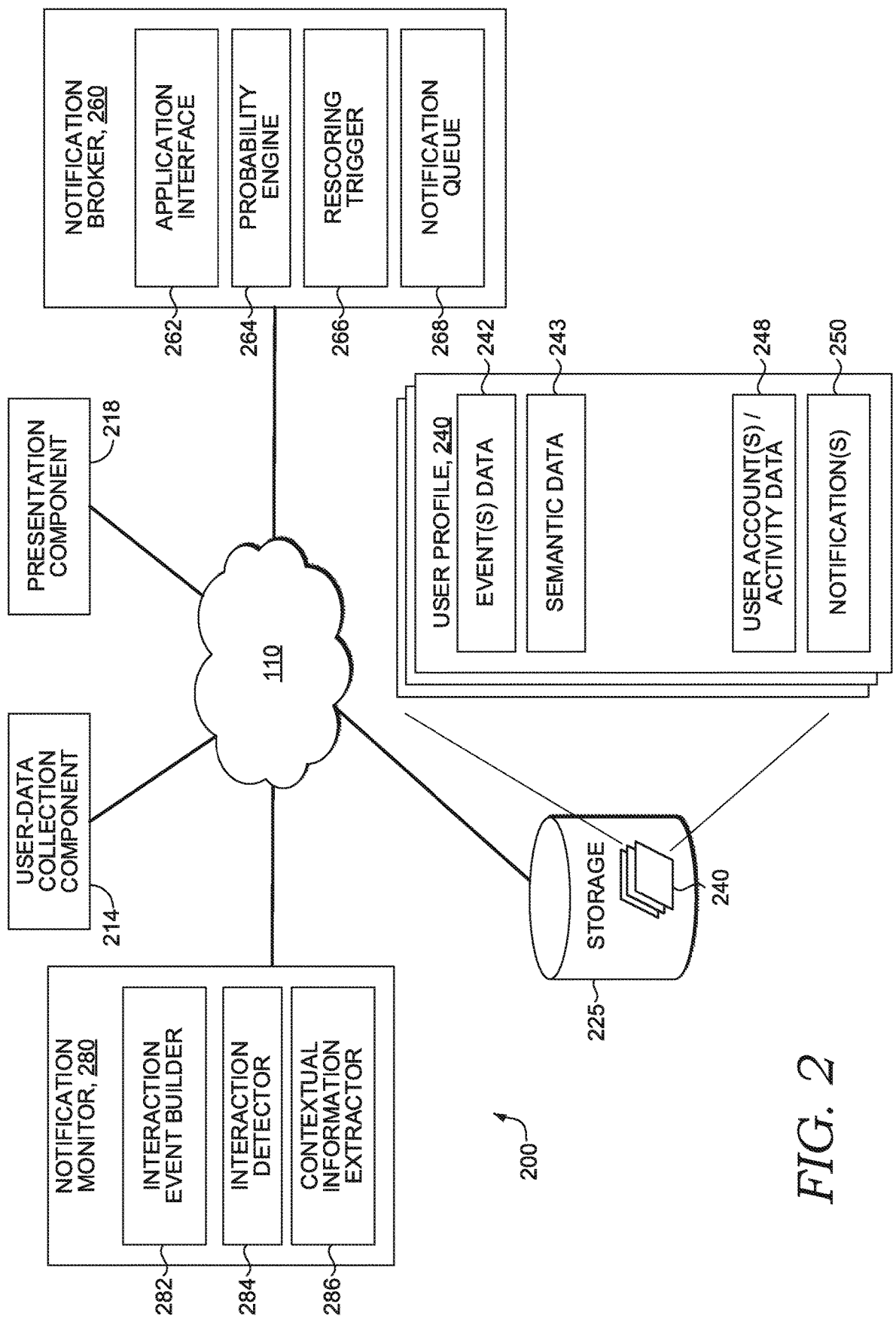
FIG. 2 is a diagram depicting an example computing architecture suitable for implementing aspects of the technology.

Operating environment 100 can be utilized to implement one or more of the components of system 200, described in FIG. 2, including components for collecting user data, monitoring notification events, generating notification content, and/or presenting notifications and related content to users. Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, notification monitor 280, notification broker 260, presentation component 218, and storage 225. Notification monitor 280 (including its components 282, 284, and 286), notification broker 260 (including its components 262, 264, 266, and 268), user-data collection component 214, and presentation component 218 may be embodied as a set of compiled computer instructions or functions, program modules, computer software services, or an arrangement of processes carried out on one or more computer systems, such as computing device 700 described in connection to FIG. 7, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In some aspects, user-data collection component 214 may be employed to facilitate the accumulation of user data of one or more users (including crowdsourced data) for notification monitor 280 and notification broker 260. The data may be received (or accessed), and optionally accumulated, reformatted, and/or combined, by data collection component 214 and stored in one or more data stores such as storage 225, where it may be available to notification monitor 280 and notification broker 260. For example, the user data may be stored in or associated with a user profile 240, as described herein.

User data may be received from a variety of sources where the data may be available in a variety of formats. For example, in some aspects, user data received via user-data collection component 214 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. User data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with events; etc.) including user activity that occurs over more than one user device, user history, session logs, application data, contacts data, calendar and schedule data, notification data, social-network data, news (including popular or trending items on search engines or social networks), online gaming data, ecommerce activity (including data from online accounts such as Amazon.com®, eBay®, PayPal®, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein. In some respects, user data may be provided in user signals. A user signal can be a feed of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some aspects, user-data collection component 214 receives or accesses data continuously, periodically, or as needed.

Notification monitor 280 is generally responsible for monitoring notifications and related information in order to describe notification events. For example, as described previously, notification events and user interactions with the notifications may be determined by monitoring user data (including data received from user-data collection component 214), and from this, notification interaction patterns may be determined and future interaction probabilities predicted based on the pattern. In some aspects, notification monitor 280 analyzes notification events and related information across multiple computing devices or in the cloud.

As shown in example system 200, notification monitor 280 comprises a notification event builder 282, interaction detector 284, and contextual information extractor 286. The notification monitor 280 builds notification event records that can be analyzed to determine a probability of a user responding to future notifications. The notification monitor 280 collects relevant contextual information when a notification is presented, determines whether the user interacted with a notification, and associates the notification description, the interaction, and contextual data in an event record. In some aspects, notification monitor 280 and/or one or more of its subcomponents may determine interpretive data from received user data. Interpretive data corresponds to data utilized by the subcomponents of notification monitor 280 to interpret user data. For example, interpretive data can be used to provide context to user data, which can support determinations or inferences made by the subcomponents. Moreover, it is contemplated that aspects of notification monitor 280 and its subcomponents may use user data and/or user data in combination with interpretive data for carrying out the objectives of the subcomponents described herein.

Notification event builder 282 builds notification events that memorialize details about a notification and a user's actions taken in response to receiving the notification. The events are used to train a model to calculate a user-specific response probability for future events. Notification events can be built every time a notification is presented to the user. An individual notification event can describe a single instance of a notification being presented to the user. Once built, the events can be stored in computer memory for subsequent analysis. The notification event includes a description of the notification, the context of the user when the notification was presented, and whether the user interacted with the notification or ignored the notification.

The event record describes features of the notification. The notification features can include the notification channel. Example notifications include lock-screen notifications, badge notifications, audible notifications, vibration notifications, and others. The notification features can include an application that generated the notification. Users can behave or react differently to different notifications. Notifications may be associated with an entity or with a class of entities (e.g., close friends, work colleagues, boss, family, businesses frequented by the user such as a bank, etc.). The notification features can include a person associated with a notification. For example, a call notification could be associated with the person who made the call.

Notification interaction detector 284, in general, is responsible for determining whether a user interacted with a notification. As mentioned, the goal of the technology is to present notifications at a time when the user will interact with them. A building block to determine when a user will interact with a future notification is a record of how the user interacted with previous notifications. Interaction information is determined by analyzing user data (received from user-data collection component 214) corresponding to events and user activity that occurs after a user is presented with a notification. In some aspects, notification interaction detector 284 receives data from presentation component 218, which may include a user interaction with a notification to which the user has become aware. For example, the presentation component 218 can provide information about whether a user selected a notification, hovered over a notification, or made eye contact with a notification (for example, using gaze detection when available). The notification interaction detector 284 can also receive contextual information about the monitored notifications from contextual information extractor 286.

Notification interaction detector 284 analyzes this information in conjunction with the monitored notifications and determines whether the user interacted with the notification. Notification interactions can be detected through direct evidence of an interaction or indirect interactions. The indirect interactions can include activities occurring on multiple user devices.

A direct observation of an interaction with a notification occurs when a user directly engages the notification, such as when the user clicks a notification. The click is an example of a notification interaction.

Aspects of the technology described herein also detect indirect interactions with a notification. Indirect interactions occur in response to the notification, but do not occur directly with the notification. For example, calling a person in response to a notification that a text was received from the person can be an indirect interaction with the notification. Simply calling a person may not be sufficient to qualify as an interaction. For example, the call may need to occur within a threshold time from receiving the notification. The threshold can be set editorially. Similarly, calling a person in response to a notification that a person called is also an interaction, though the interaction does not occur directly with the notification and through a communication channel unrelated to the notification.

In some aspects, interaction detector 284 uses information from user account(s)/activity data 248 for monitoring social network activity related to a user. Interaction detector 284 may also monitor user activity in response to events detected by notification monitor 280. In so doing, some aspects of interaction detector 284 determine that a user likely has not addressed, or likely has not interacted with, a notification based on the user activity. For example, where user activity indicates that a user has not accessed a social media account, or where a user (or other users) typically responds to or reacts to a similar notification, with a certain pattern of user activity, but such user activity has not been detected by interaction detector 284, then it may be determined that the user likely has not interacted with the notification.

In one aspect, interaction detector 284 considers typical user interaction patterns for similar notifications to determine whether a user interaction occurred. The user response interaction patterns may be compared to current or recent user-activity data in order to determine whether the user has interacted (or is likely to interact) with a notification. For example, where the user is presented a calendar (or task) notification that indicates that his anniversary is next week and user data, such as the user's email or website user history indicates that the user made a reservation at a restaurant on the date of the anniversary, then it may be determined that the user has interacted with the notification and thus notification broker 260 can determine that a probability exists that a similar notification (e.g., important data reminder) presented in a similar context in the future will be interacted with by the user.

As another example of an indirect interaction with a notification through a different communication channel, suppose an email is received on an account associated with a user and contextual information associated with the email indicates that it is from the user's boss. A notification is presented on a laptop that an email has been received, but no direct interaction with the notification is detected. User data indicates that the user accessed his email, was presented with the email on a user device (in other words, the user likely has read the email from his boss), but the user has not replied to the email. But user data also indicates that the user called his boss (from his smartphone) after accessing the email. Then it may be determined by combing these actions, which occurred on two different devices, that the user has likely interacted with the notification, suggesting that similar notifications will be interacted with when presented in a similar context.

As yet another example, suppose a notification is presented that a user missed a call, and contextual information associated with the call indicates that the user's wife called. User data indicates that the user has not placed a call to his wife or otherwise electronically communicated since the missed call. Thus, the notification may be classified as not interacted with.

Now, suppose further that the user was not at the same location as his wife when the missed call occurred (location may be determined from a user device associated with the user, such as a smartphone), but now the user's location and the wife's location are the same; for example, both are presently located at home. Then it may be determined less likely that the notification event (the missed call) was ignored because the user and his wife are at home together and presumably communicating with each other. The elapsed time between changing locations can also be a factor used to classify notifications as interacted with or ignored.

Whether an interaction occurred can be determined using a heuristic or a machine classifier. In the case of a direct interaction, such as a click on a notification, a heuristic is sufficient. Rules or heuristics can be set up to detect a click, hover, visual contact, or other direct interaction with a notification that is captured by a computer and record an affirmative interaction in the notification event. The nature of the interaction can also be recorded. Rules can also be used to detect some indirect interactions. For example, a rule could be used to determine an interaction occurred when a user communicates with an entity through any means upon receiving a notification indicating that a communication was received from the entity. The result can be a log of interactions with each notification.

The determination of whether an interaction occurred can be determined using a machine-learning classifier. The supervised learning process is one type of machine learning that may be suitable. The supervised learning process can use labeled training data to classify a series of actions taken by a user after a notification is received as an interaction with a notification. For example, a series of actions, such as a phone call, purchase, meeting invite, text, social post, along with a related notification could be mapped as independent variables and a manual tag specifying that the combination of actions qualified as an interaction as the dependent variable. The training data is used to train a function (different supervised learning processes can use different functions) to map the user action data and notification description to the output. In this way, the function should classify a combination of actions as the desired outcome (i.e., an interaction) given a similar action data and notification data as in the training data. The action data, interaction data, and notification data can be preprocessed to fit a schema that can be used to input data to the function during both training and use.

Contextual information extractor 286, in general, is responsible for determining contextual information associated with the notification monitored by notification monitor 280, such as context features or variables associated with events and user-related activity. The contextual information can help explain what the user is doing when the notification is received. For example, the contextual information can include applications running or being interacted with by the user when a notification is received. Contextual information may be determined from the user data of one or more users provided by user-data collection component 214. For example, contextual information extractor 286 receives user data, parses the data, in some instances, and identifies and extracts context features or variables. In some aspects, variables are stored as a related set of contextual information associated with an event, response, or user activity within a time interval following an event (which may be indicative of a user response).

In particular, some aspects of contextual information extractor 286 determine contextual information related to an event, contact-entity (or entities, such as in the case of a group email), user activity surrounding the event, and current user activity. By way of example and not limitation, this may include context features such as location data; time, day, and/or date; number and/or frequency of notifications; keywords in the notification (which may be used for determining); contextual information about an entity associated with a notification (such as the entity identity, relation to the user, location of the contacting entity if determinable, frequency or level of previous contact with the user); history information including patterns and history with the contact-entity; mode or type of notification(s); what user activity the user engages in when an event occurs or when likely responding to a notification, as well as when, where, and how long the user engages in activity associated with the notification event; or any other variables determinable from the user data, including user data from other users. A notification can be associated with an entity when the notification indicates that a social post, email, text, phone call, voicemail, or other content was received from an entity (e.g., person or business). A system notification, such as a request to update an application, can be associated with the application publisher.

In still another example, user interaction probability may be determined using calendar information from one or more user calendars, such as office calendars, personal calendars, social media calendars, or even calendars from family members or friends of the user, in some instances. Some aspects of the technology may construct a complementary or shadow calendar for a user for use in determining interaction probability. In particular, in such aspects, the complementary or shadow calendar may be used for creating an interaction probability model of the user.

In an aspect, the complementary calendar may be constructed based upon sensor data associated with a user of a device. For example, a social network profile (e.g., social network posts, social network messages, a user profile indicating hobbies or interest of the users) may be evaluated to identify an activity of the user as a particular sensor data. In another example, a context of the user's device may be evaluated to identify an activity of the user as the sensor data (e.g., a device location may be indicative of the user going to soccer practice at a soccer field on Tuesdays; a device location check-in may be indicative of the user going out on a movie date on Sundays (e.g., the user may check-in through a social network); a connectivity state, such as Wi-Fi connectivity, may indicate that the user is at home, in the office, or at a coffee shop; a charging state, such as a car charging state, may indicate that the user is currently driving; a vacation itinerary file on the device may indicate that the user will be going on a vacation in a week; etc.).

It may be appreciated that, in some aspects, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data, such as traffic information, weather, or supplemental information, which may include information from the user's social media accounts, family's or friends' social media accounts, email, news, and other user data (e.g., crowdsourced data)). In this way, the complementary calendar may be constructed with one or more entries derived from sensor data (e.g., automatically generated entries based upon inferred activities). In an aspect, a complementary calendar may be merged with one or more calendars (e.g., the user's primary calendar, a family calendar, a social network calendar, etc.) to create a shadow calendar comprising at least some of the complementary calendar (e.g., automatically generated entries derived/inferred from sensor data) and at least some of the one or more calendars (e.g., user entries populated within the primary calendar by the user). Scheduling conflicts may be identified based upon the complementary calendar and/or the shadow calendar (e.g., a user entry may indicate that the user has a 9:00-9:30 AM Monday work meeting and an entry within the complementary calendar may indicate that the user is to meet a friend for coffee at 9:15 AM on Monday based upon a social network post).

Continuing with FIG. 2, notification broker 260 is generally responsible for generating and providing notification content regarding an event where it may be provided to the user as a personalized notification. In one aspect, the notification content includes a notification, which may be in the form of a recommended action for the user to address an unaddressed event, and may further include supplemental content for assisting the user in addressing the event. As shown in example system 200, notification broker 260 comprises application interface 262, probability engine 264, rescoring trigger 266, and notification queue 268.

In some aspects, notification broker 260 generates a notification to be presented to a user, which may be provided to presentation component 218. Alternatively, in other aspects, notification broker 260 generates notification content and makes it available to presentation component 218, which determines how (i.e., what format) to present the notification based on notification logic in the notification content and user data applied to the notification logic. In some aspects, a notifications service or application operating in conjunction with presentation component 218 determines or facilitates determining how to present the notification. Pending presented notifications associated with a user may be stored in a user profile 240, such as in a notification(s) component 250. Further, in some aspects, notification broker 260, presentation component 218, and/or a notifications service or application manages pending notifications for a user and may prioritize which notifications are presented, such as described below.

Notification broker 260 may receive information from user-data collection component 214 and/or notification monitor 280 (which may be stored in a user profile 240 that is associated with the user) through application interface 262. The application interface 262 can receive notifications from applications and services for presentation to the user. The application interface 262 can provide a presentation/response status to the application or service upon presenting a notification to the user.

Probability engine 264, in general, is responsible for determining notification interaction patterns. In some aspects, interaction patterns may be determined by monitoring one or more variables related to notifications or user interactions to those notifications. These monitored variables may be determined from the user data described in connection to user-data collection component 214 (for example: location, time/day, the initiator(s) or recipient(s) of a communication associated with a notification, the communication type (e.g., call, email, text, etc.), user device data, etc.) associated with a notification.

Further, in some aspects, probability engine 264 determines response information using crowdsourcing data or data from multiple users, which can be used for determining likely interaction patterns for a particular user based on the premise that the particular user will react similarly to other users. For example, an interaction probability may be determined based on determinations that other users are more likely to call their friends and family members in the evenings but are less likely to call these same entities during the day while at work. Similarly, a user pattern may be determined based on determinations that other users typically call their spouse back at a soonest convenient time, but call their boss back as soon as possible even if it is inconvenient. The notification interaction probability can be calculated using these communication patterns as an input to ascertain whether a notification associated with one of these communications is likely to draw an interaction from the user.

In particular, the variables associated with a notification interaction may be determined from contextual data related to notification events, which may be extracted from the user data by contextual information extractor 286, as described herein. Thus, the variables can represent context similarities among multiple events. In this way, patterns may be identified by detecting variables in common over multiple events. More specifically, variables associated with a first notification event may be correlated with variables of a second notification event to identify in-common variables for determining a likely pattern. For example, where a first notification event comprises a user immediately clicking on a notification indicating that a text was received from a contact identified as "Steve" on Tuesday at 3:30 PM and the user immediately clicking on a notification indicating that a text was received from a contact identified as "Steve" on Wednesday at 2:08 PM, a pattern may be determined that the user interacts with text notifications from Steve during the workday. In this case, the in-common variables for the two events include the same contact-entity (Steve), the same type of day (workday), the same time classification (work hours), and the same type or mode of communication (a text). Semantic information about Steve and the relationship between Steve and the user could be used to expand the pattern. For example, if Steve is a co-worker, the pattern could be extrapolated from Steve to a class of people (co-workers). This extrapolation could be strengthened if the user promptly responded to texts from other co-workers during work hours on workdays.

An identified pattern becomes stronger (i.e., more likely or more predictable) the more often the event instances that make up the pattern are repeated. Similarly, specific variables can become more strongly associated with a pattern as they are repeated. For example, suppose every day after 5:00 PM (after work) and while driving, a user does not interact with notifications about communications received from anyone. While the specific person related to the notification varies (i.e., the contact-entity that sent a text or called), an event pattern exists because the user repeatedly ignores notifications while driving.

Interaction patterns do not necessarily include the same communication modes. For instance, one pattern may be that a user responds to calls or emails from his mom, but only during non-work hours.

The probability engine 264 calculates a user-specific interaction probability for each of the notifications by analyzing the updated contextual information using a machine-learning mechanism trained using historical notification event data.

Use of different machine learning-processes are possible in different aspects, including supervised learning processes (e.g., decision tree, random forest, logistic regression), unsupervised learning (e.g., apriori algorithm, K-means), or reinforcement learning. In each case, the contextual data and notification description is an input used to determine the user-specific interaction probability. Essentially, the user-specific interaction probability is a measure of similarity between the current notification and context and the previous notification events where the user interacted with the notification.

Each of these machine-learning methods uses historical contextual data, notification data, and interaction data to train the machine-learning model. This data can be collected as notification event data, as described previously. The different types of a machine-learning processes can use the historical data differently during the training process.

The supervised learning processes use the historical contextual data and notification description as independent variables and the associated interaction observation as the dependent variable. The historical data is used to train a function (different supervised learning processes can use different functions) to map to the contextual data and notification description to the output. In this way, the function should predict the desired outcome (i.e., interaction) given a similar contextual data and notification data as input. The contextual data, interaction data, and notification data can be preprocessed to fit a schema that can be used to input data to the function during both training and use.

Some learning methods generally attempt to cluster people or objects based on similar characteristics. This may be suitable for finding some interaction probabilities via extrapolation from similar data, for example, a person may interact the same way with notifications having similar characteristics. The group characteristics (e.g., system notification, social media notification) can then be used to determine how a user would respond to a notification from an entity where no direct observations have been made. A learning method may use contextual data to classify notifications as similar to others in a similar context. Clustering can help solve a cold-start problem (no previous interactions with a user, app, or other entity being evaluated). For example, when a new user is added to the system, then app-level and device-context features may be used instead of user features to determine an interaction probability. The history of all apps/services currently available to devices can be used to predict a new user's interactions based on historical interactions with a given app/service from all of the users of that app/service. Different approaches can be taken when a new application is being evaluated (instead of a new user). The system can categorize the app and predict the notification engagement based on all users previous engagements with the same category of application (e.g., music application, email application). Or the system can predict a user's engagement with a given notification based on the same user's interaction history with applications of the same category.

The technology can also use reinforcement learning, which trains the machine to make specific decisions, such as select a user-specific interaction probability. In reinforcement learning, the machine trains itself using trial and error using historical data. For example, in reinforcement learning the machine is rewarded for making a right decision, and penalized for making the wrong decision. The reinforced learning machine makes a decision and then evaluates the reward/penalty to maximize the reward, and updates the priors on the features based on that information. It then takes the next decision.

While different machine-learning processes can be used, including different processes for different notification types or data environments, they all use historical notification event data and current contextual data.

The rescoring trigger 266 detects occurrence of a trigger that causes notifications in the notification queue 268 to be rescored. Notifications in the notification queue 268 can be reevaluated at a subsequent point in time by calculating a new user-specific interaction probability. The probability can change as context changes. A notification with a low probability at the first calculation can have a new probability that is greater than the threshold the next time the calculation is made.

Various triggers can cause a new probability to be calculated for one or more notifications in the notification queue 268. The trigger can include receiving a new notification for evaluation. The trigger can include the passing of a threshold amount of time since the last calculation. The trigger can be based on a changing context, such as arriving at a new location, ending a meeting, ending a call, opening a new application, closing an application, and other factors. In one aspect, contextual information is evaluated at regular intervals and compared to the trigger criteria.

The notification queue 268 stores notifications that have not been presented to the user. Notifications with a user-specific interaction probability below the threshold are held in the notification queue 268. Notifications in the queue can be reevaluated at a subsequent point in time by calculating a new user-specific interaction probability. The probability can change as context changes. A notification with a low probability at the first calculation can have a new probability that is greater than the threshold the next time the calculation is made.

Example system 200 also includes a presentation component 218 that is generally responsible for presenting notifications and related content to a user, based on the notification content determined by notification broker 260. Presentation component 218 may comprise one or more applications or services on a user device, across multiple user devices, or in the cloud. For example, in one aspect, presentation component 218 manages the presentation of notification content to a user across multiple user devices associated with that user.

In some aspects, presentation component 218 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

As described previously, in some aspects, a personal assistant service or application operating in conjunction with presentation component 218 determines when and how to present the notification. In such aspects, the notification content may be understood as a recommendation to the presentation component 218 (and/or personal assistant service or application) for when and how to present the notification, which may be overridden by the personal assistant application or presentation component 218.

Example system 200 also includes storage 225. Storage 225 generally stores information including data, computer instructions (e.g., software program instructions, routines, or services), and/or models used in aspects of the technology described herein. In an aspect, storage 225 comprises a data store (or computer data memory). Further, although depicted as a single data store component, storage 225 may be embodied as one or more data stores or may be in the cloud.

In an aspect, storage 225 stores one or more user profiles 240, an example aspect of which is illustratively provided in FIG. 2. Example user profile 240 may include information associated with a particular user or, in some instances, a category of users. As shown, user profile 240 includes event(s) data 242, semantic data 243, user account(s) and activity data 248, and pending notification(s) 250. The information stored in user profiles 240 may be available to the routines or other components of example system 200. The semantic data 243 can include information about the user, such as home address, family relations, work relations, and other profile information.

In particular, user account(s) and activity data 248 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Aspects of user account(s) and activity data 248 may store information across one or more databases, knowledge graphs, or data structures.

Notification(s) 250 generally includes data about pending notifications associated with a user, which may include notification content corresponding to one or more unaddressed events. In some aspects, notification(s) 250 includes data corresponding to notifications that have not yet been presented to a user or supplemental content that may not be provided to a user. (Further, in some aspects, notification(s) 250 may also include information about previously pending notifications.)

Figure 3:
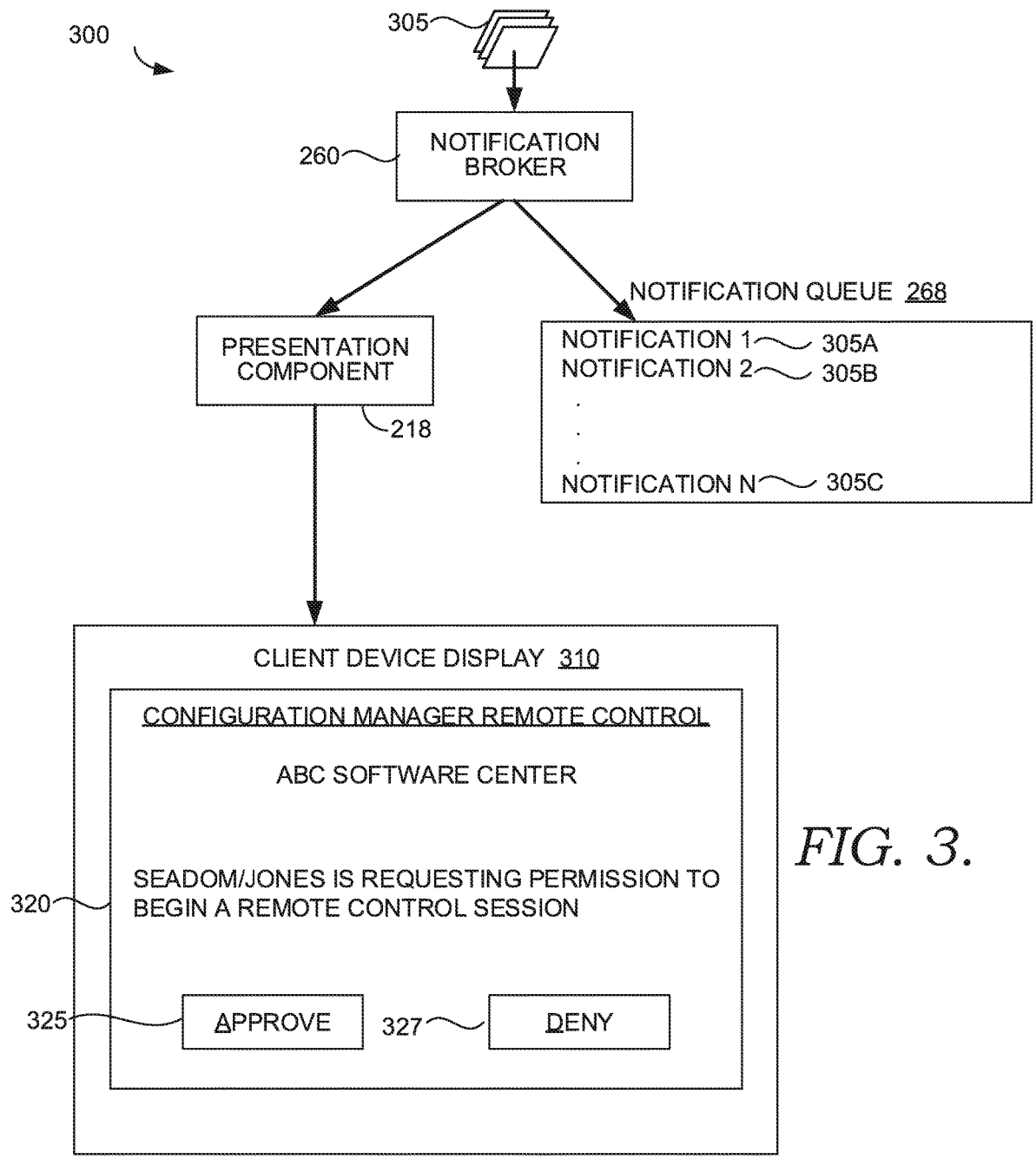
FIG. 3 depicts one example of notification content that may be presented to a user, in accordance with an aspect of the technology.

Turning now to FIG. 3, an example of a notification broker is provided. Initially, a plurality of notifications 305 are received by the notification broker 260. The notifications can be received from applications residing on a client device, a service, or some other source. As described previously, the notification broker 260 assigns a notification probability to each notification in the plurality of notifications 305. Notifications with less than a threshold probability are stored in the notification queue 268. As can be seen, a first notification 305A, a second notification 305B, and an Nth notification 305C are stored in the notification queue 268. These notifications may be reevaluated upon occurrence of a rescoring trigger.

Notifications with above a threshold probability are communicated to the presentation component 218. The presentation component 218 outputs the notification according to the parameters of the notification and any notification logic. In this example, a pop-up notification 320 is provided on the client display device 310. The user is asked to interact with the notification by selecting approve 325 or deny 327. The user selecting either choice would be an example of a direct interaction with the notification. Some notifications do not solicit a direct interaction, but the user could nevertheless dismiss the notification, select the notification to open a related application, or otherwise directly interact with the notification.

Figure 4:
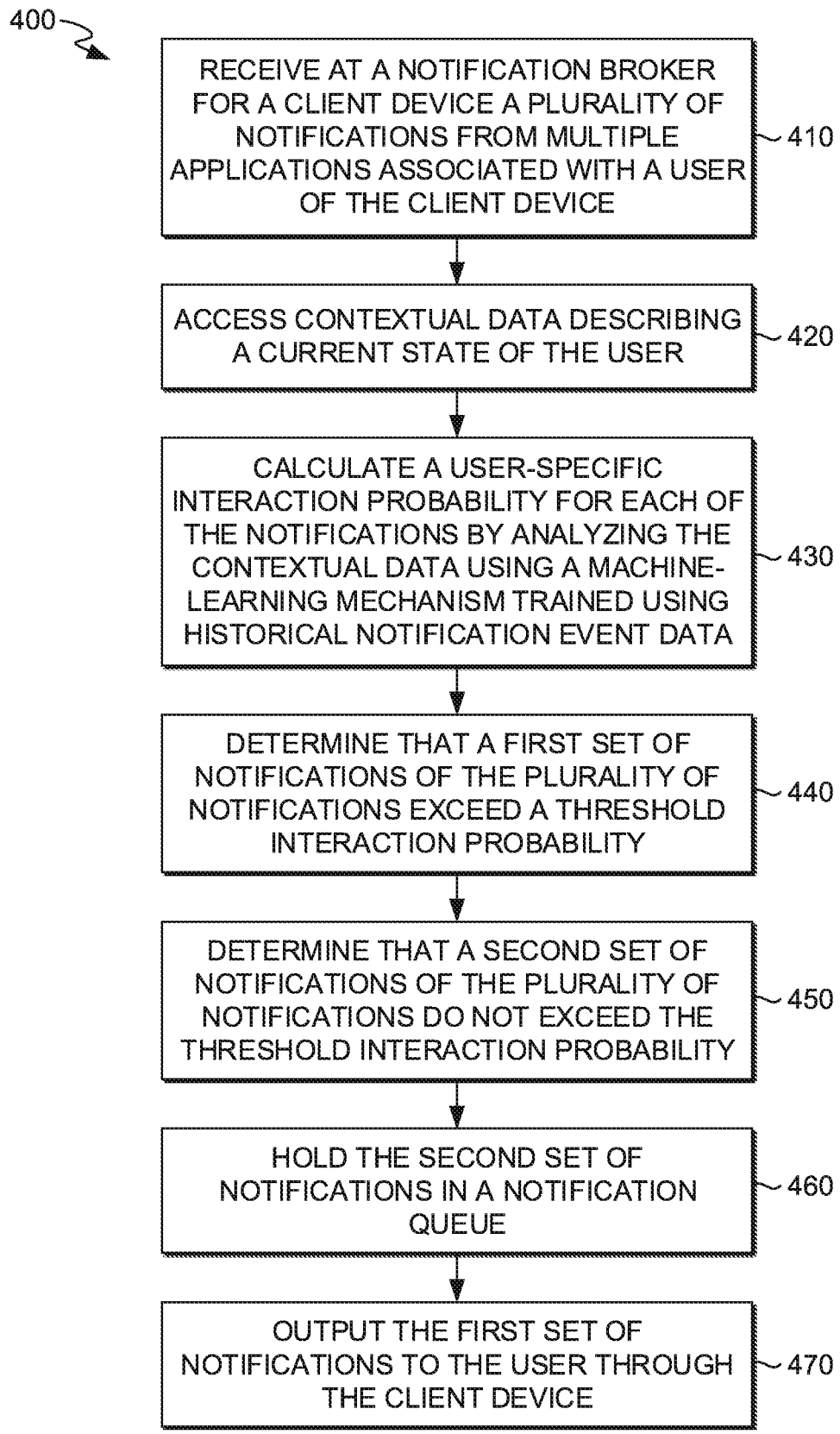
FIGS. 4-6 depict flow diagrams of methods for providing personalized notification content to a user, in accordance with an aspect of the technology.

Turning now to FIG. 4, a flow diagram is provided illustrating one example method 400 for providing user-personalized notification management. Each block or step of method 400 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

At step 410, a plurality of notifications are received from multiple applications associated with a user of a client device at a notification broker for the client device. The notification may specify one or more formats for notifications (i.e., how notification(s) may be provided to the user) and the timing of the notification presentation. For example, a calendar application may communicate a 15 minute warning notification to the notification broker specifying a time for presentation. The notifications can specify a channel for communication, such as a lock-screen channel, audible channel, etc. The notification can include logic that specifies a different channel under different phone states. For example, the channel could be a lock-screen when the phone is in sleep mode, but audible when the phone is being used. Aspects of the technology described herein can follow the channel guidance, but determine when or whether the notification is presented based on a probability the user will respond to the notification.

At step 420, contextual information describing a current state of the user is accessed. Contextual information may include context features or variables associated with a user activity and may be determined from user data (or sensor data) or pattern information determined from the user data. In some aspects, this includes user data from a plurality of users. The contextual information can be received from multiple devices associated with a user.

At step 430, a user-specific interaction probability is calculated for each of the notifications by analyzing the updated contextual information using a machine learning mechanism trained using historical notification event data.

Use of different machine-learning processes are possible in different aspects, including supervised learning processes (e.g., decision tree, random forest, logistic regression), unsupervised learning (e.g., apriori algorithm, K-means), or reinforcement learning. In each case, the contextual data and notification description is an input used to determine the user-specific interaction probability. Essentially, the user-specific interaction probability is a measure of similarity between the current notification and context and the previous notification events where the user interacted with the notification.

Each of these machine-learning methods uses historical contextual data, notification data, and interaction data to train the machine-learning model. This data can be collected as notification event data, as described previously. The different types of a machine-learning processes can use the historical data differently during the training process.

The supervised learning processes use the historical contextual data and notification description as independent variables and the associated interaction observation as the dependent variable. The historical data is used to train a function (different supervised learning processes can use different functions) to map to the contextual data and notification description to the output. In this way, the function should predict the desired outcome (i.e., interaction) given a similar contextual data and notification data as input. The contextual data, interaction data, and notification data can be preprocessed to fit a schema that can be used to input data to the function during both training and use.

Some learning methods generally attempt to cluster people or objects based on similar characteristics. This may be suitable for finding some interaction probabilities via extrapolation from similar data, for example, a person may interact the same way with notifications having similar characteristics. The group characteristics (e.g., system notification, social media notification) can then be used to determine how a user would respond to a notification from an entity where no direct observations have been made. A learning method may use contextual data to classify notifications as similar to others in a similar context. Clustering can help solve a cold-start problem (no previous interactions with a user, app, or other entity being evaluated). For example, when a new user is added to the system, then app-level and device-context features may be used instead of user features to determine an interaction probability. The history of all apps/services currently available to devices can be used to predict a new user's interactions based on historical interactions with a given app/service from all of the users of that app/service. Different approaches can be taken when a new application is being evaluated (instead of a new user). The system can categorize the app and predict the notification engagement based on all users previous engagements with the same category of application (e.g., music application, email application). Or the system can predict a user's engagement with a given notification based on the same user's interaction history with applications of the same category.

The technology can also use reinforcement learning, which trains the machine to make specific decisions, such as select a user-specific interaction probability. In reinforcement learning, the machine trains itself using trial and error using historical data. For example, in reinforcement learning the machine is rewarded for making a right decision, and penalized for making the wrong decision. The reinforced learning machine makes a decision and then evaluates the reward/penalty so as to maximize the reward, and updates the priors on the features based on that information. It then takes the next decision.

While different machine-learning processes can be used, including different processes for different notification types or data environments, they all use historical notification event data and current contextual data.

At step 440, a first set of notifications from the plurality of notifications are determined to exceed the threshold interaction probability. The threshold probability can be set editorially. In one aspect, the threshold is selected from the group consisting of 50%, 60%, 75%, and 90%.

At step 450, a second set of notifications of the plurality of notifications are determined not to exceed the threshold interaction probability.

At step 460, the second set of notifications in a notification queue are held and not presented to the user until a later time, if at all. Notifications with a user-specific interaction probability below the threshold are held in a notification queue. Notifications in the queue can be reevaluated at a subsequent point in time by calculating a new user-specific interaction probability. The probability can change as context changes. A notification with a low probability at the first calculation can have a new probability that is greater than the threshold the next time the calculation is made.

Various triggers can cause a new probability to be calculated for one or more notifications in the notification queue. The trigger can include receiving a new notification for evaluation. The trigger can include the passing of a threshold amount of time since the last calculation. The trigger can be based on a changing context, such as arriving at a new location, ending a meeting, ending a call, opening a new application, closing an application, and other factors. In one aspect, contextual information is evaluated at regular intervals and compared to the trigger criteria.

At step 470, the first set of notifications is output to the user through the client device. Some aspects of step 470 also include generating user interface features associated with the notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, or prompts. In some aspects, user responses to notifications or user activity associated with the presented notification is captured for use in improving notification management services provided to the user. Additional details regarding presenting a notification in step 470 are provided in connection to presentation component 218 and notification broker 260 in FIG. 2 and the example described in connection to FIG. 3.

In some cases, the notification is output only after a notification logic is satisfied. Notification logic may specify rules, conditions, constraints, times (including future times or time windows), priority with regards to other notifications, and/or other parameters for notifying the user of the unaddressed event, the content to be included in notifications, as well as logic specifying or recommending formats for presenting notification(s). For example, the notification logic may limit the number of notifications presented to a user, during a period of time, such as day.

Figure 5:
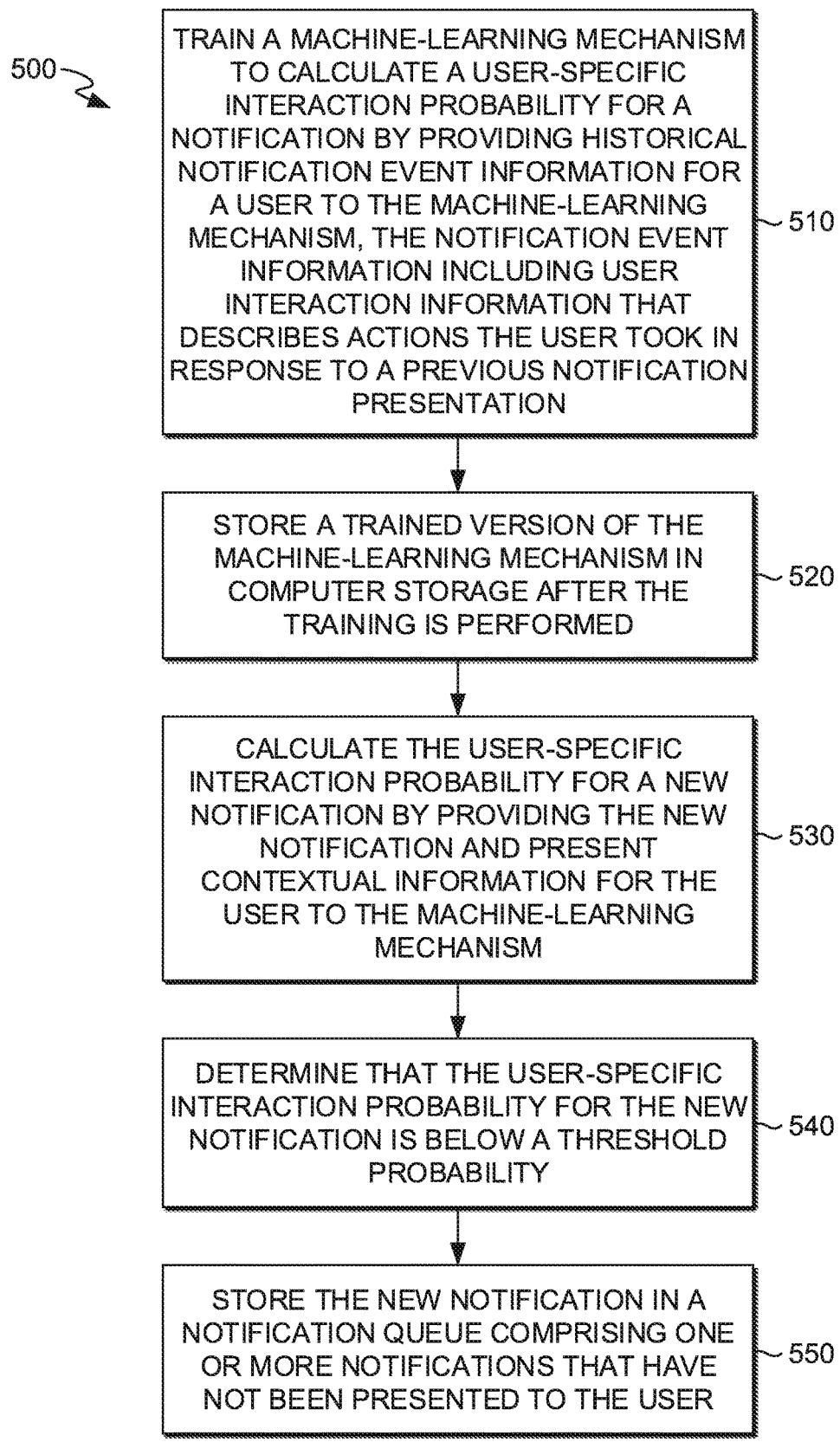

Turning now to FIG. 5, a flow diagram is provided illustrating one example method 500 for brokering notifications on a client device. Each block or step of method 500 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

At step 510, a machine-learning mechanism is trained to calculate a user-specific interaction probability for a notification by providing historical notification event information for a user to the machine-learning mechanism. The notification event information includes user interaction information that describes actions the user took in response to a previous notification presentation.

For example, if the machine-learning mechanism is a supervised learning method, then the supervised learning processes use the historical contextual data and notification description as independent variables and the associated interaction observation as the dependent variable. The historical data is used to train a function (different supervised learning processes can use different functions) to map to the contextual data and notification description to the output. In this way, the function should predict the desired outcome (i.e., interaction) given a similar contextual data and notification data as input. The contextual data, interaction data, and notification data can be preprocessed to fit a schema that can be used to input data to the function during both training and use.

At step 520, a trained version of the machine-learning mechanism is stored in computer storage after the training is performed. The broker may reside on a client device, in which case the machine-learning mechanism may be stored on the client device. It is possible for the training to occur in a data center and for the trained model to be transferred to the client device and stored for later use.

At step 530, the user-specific interaction probability is calculated for a new notification by providing the new notification and present contextual information for the user to the machine-learning mechanism. As described previously, the machine-learning mechanism calculated a probability taking the current context as input. Essentially, the current context is compared with previous contexts when the user interacted with a similar notification to arrive at an interaction probability.

At step 540, the user-specific interaction probability for the new notification is determined to be below a threshold probability.

At step 550, the new notification is stored in a notification queue comprising one or more notifications that have not been presented to the user. New user-specific interaction probabilities can be calculated for notifications in the notification queue upon occurrence of a trigger, as previously described.

Figure 6:
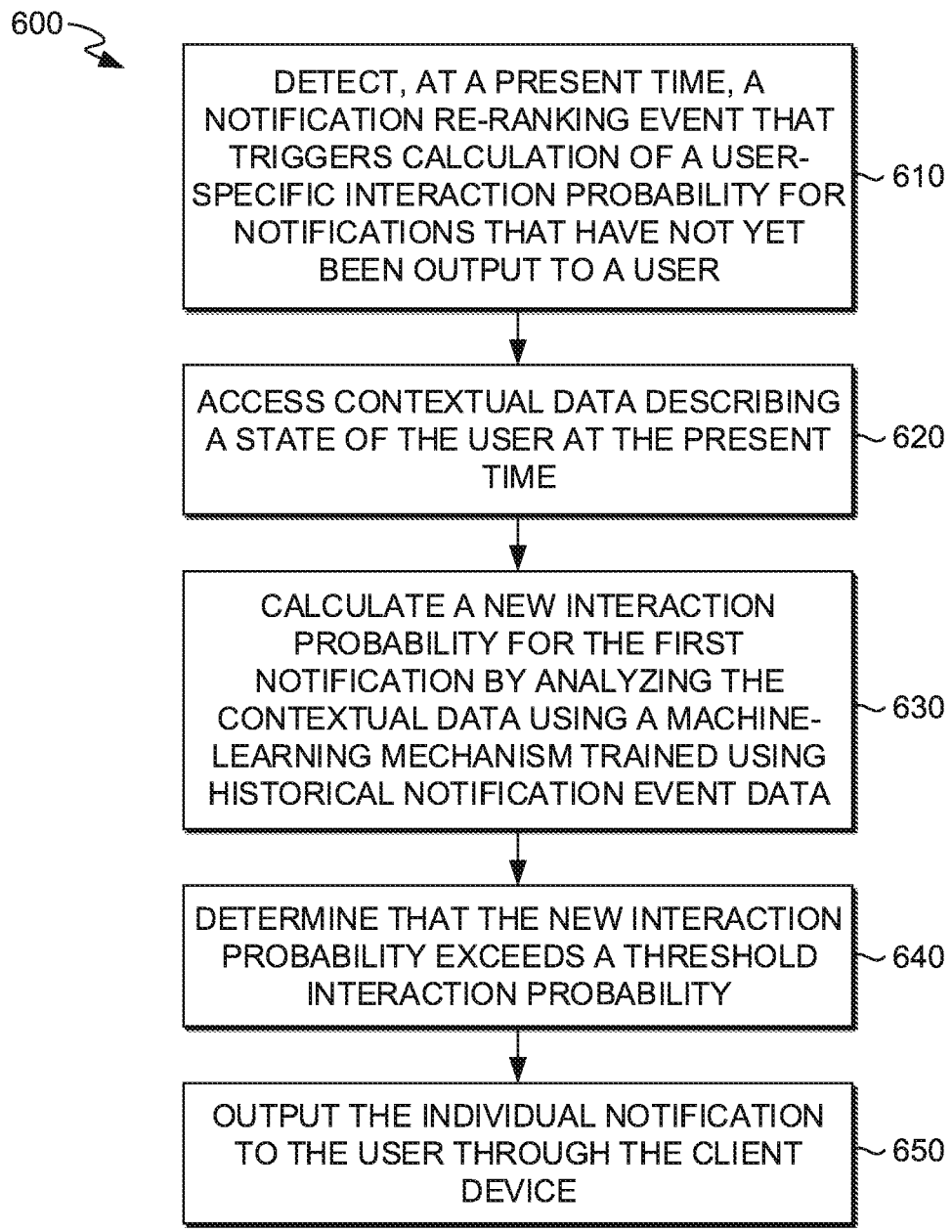

Turning now to FIG. 6, a flow diagram is provided illustrating one example method 600 for brokering notifications on a client device. Each block or step of method 600 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

At step 610, at a present time, a notification re-ranking event is detected. The event triggers calculation of a user-specific interaction probability for notifications that have not yet been output to the user. Notifications in the queue can be reevaluated at a subsequent point in time by calculating a new user-specific interaction probability. The probability can change as context changes. A notification with a low probability at the first calculation can have a new probability that is greater than the threshold the next time the calculation is made.

Various re-ranking events, or triggers, can cause a new probability to be calculated for one or more notifications in the notification queue. The trigger can include receiving a new notification for evaluation. The trigger can include the passing of a threshold amount of time since the last calculation. The trigger can be based on a changing context, such as arriving at a new location, ending a meeting, ending a call, opening a new application, closing an application, and other factors. In one aspect, contextual information is evaluated at regular intervals and compared to the trigger criteria.

At step 620, contextual data describing a state of the user at the present time is accessed. Contextual information may include context features or variables associated with a user activity and may be determined from user data (or sensor data) or pattern information determined from the user data. In some aspects, this includes user data from a plurality of users. The contextual information can be received from multiple devices associated with a user.

At step 630, a new interaction probability for the first notification is calculated by analyzing the contextual data using a machine-learning mechanism trained using historical notification event data, as described previously.

At step 640, the new interaction probability is determined to exceed a threshold interaction probability, as described previously.

At step 650, the individual notification is output to the user through the client device, as described previously.

Figure 7:
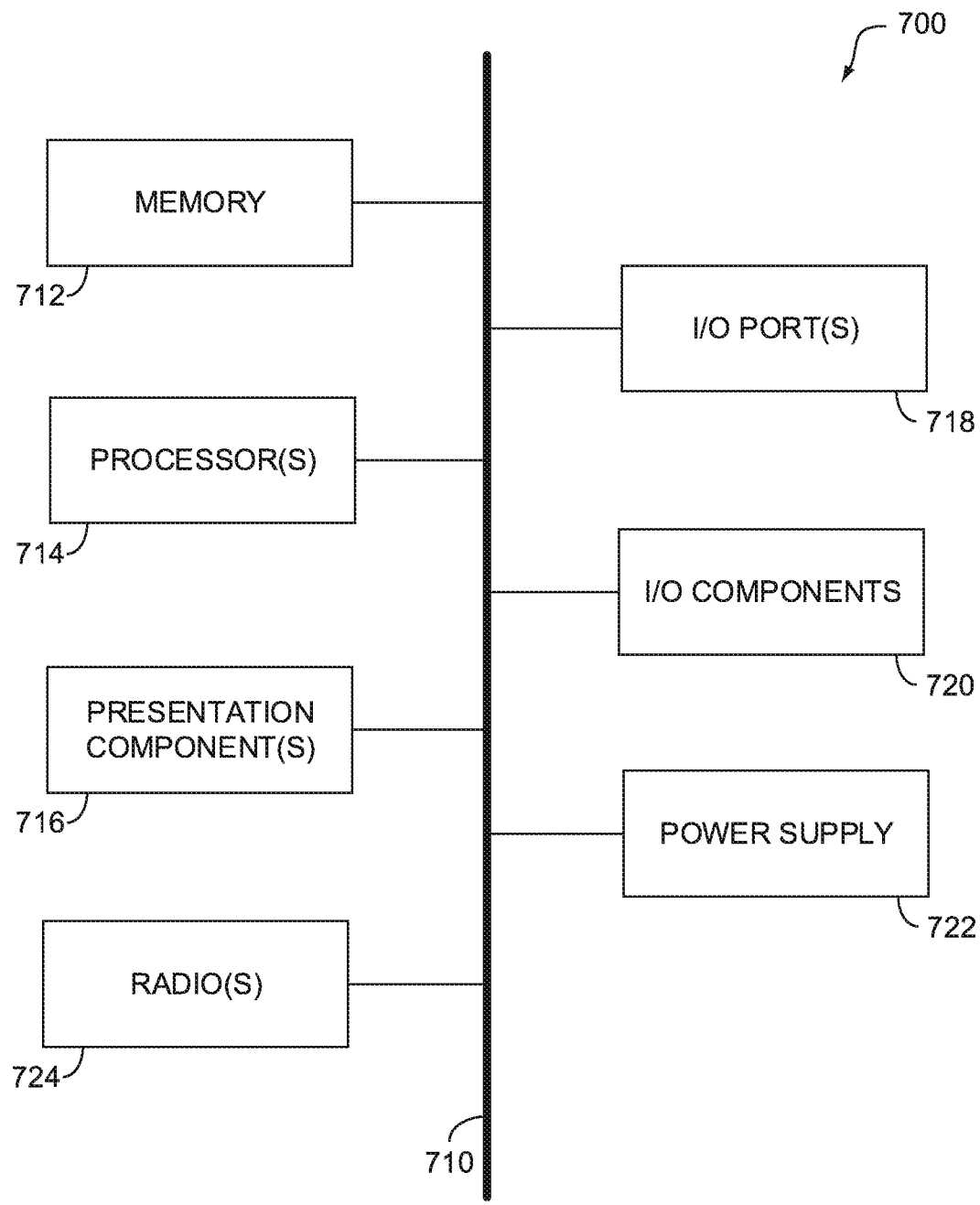
FIG. 7 is a block diagram of an exemplary computing environment suitable for use in implementing an aspect of the technology.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present technology. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer-storage media and communication media.

Computer-storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc.

The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of brokering notifications on a client device comprising:

receiving at a notification broker for a client device a plurality of notifications from multiple applications associated with a user of the client device;

accessing contextual data describing a current state of the user;

communicating the contextual data to a machine-learning mechanism trained using historical notification event data as training data, wherein the training data comprises a detected user interaction with a presented notification as a dependent variable and notification characteristics of the presented notification as an independent variable;

calculating, using the machine-learning mechanism, a user-specific interaction probability for each of the plurality of notifications by analyzing the contextual data, wherein the plurality of notifications have designated notification channels when received at the notification broker from the multiple applications, and wherein an individual channel for a notification is an input used by the machine-learning mechanism to calculate the user-specific interaction probability;

determining that a first set of notifications of the plurality of notifications exceeds a threshold interaction probability;

determining that a second set of notifications of the plurality of notifications does not exceed the threshold interaction probability;

holding the second set of notifications in a notification queue;

outputting the first set of notifications to the user through the client device;

detecting a re-ranking event comprising an end of a meeting the user is scheduled to attend;

accessing updated contextual data describing an updated state of the user;

calculating a new interaction probability for notifications from the second set of notifications being held in the notification queue by analyzing the updated contextual data;

determining that a third set of notifications from the second set of notifications exceeds the threshold interaction probability; and outputting the third set of notifications to the user through the client device.

2. The method of claim 1, wherein the historical notification event data describes interactions by the user with notifications communicated to the user.

3. The method of claim 1, wherein the historical notification event data describes interactions by multiple users with notifications communicated to the multiple users.

4. The method of claim 1, further comprising, prior to said outputting, determining that an amount of notifications in the first set of notifications is less than a threshold notification limit for a time period.

5. The method of claim 1, wherein the re-ranking event also comprises receiving a new notification at the notification broker.

6. The method of claim 1, wherein the re-ranking event also comprises a designated amount of time elapsing after said outputting.

7. The method of claim 1, wherein the method further comprises:

training the machine-learning mechanism to calculate the user-specific interaction probability for the notification using the training data; and storing the machine-learning mechanism in a computer storage after the training is performed.

8. A method of brokering notifications on a client device comprising:

training a machine-learning mechanism to calculate a user-specific interaction probability for a notification by providing historical notification event data for a user to the machine-learning mechanism as training data, wherein the training data comprises a detected user interaction with a presented notification as a dependent variable and notification characteristics of the presented notification as an independent variable, wherein the historical notification event data includes user interaction information that describes actions the user took in response to a previous notification presentation, where a user interaction with a notification presented on the client device occurred based on the user taking action related to the notification on a second computing device associated with the user;

storing a trained version of the machine-learning mechanism in computer storage after the training is performed;

providing a new notification and present contextual information for the user to the machine-learning mechanism;

receiving the user-specific interaction probability for the new notification from the machine-learning mechanism, the user-specific interaction probability determined using the new notification and present contextual information as input;

determining that the user-specific interaction probability for the new notification is above a threshold interaction probability;

outputting the new notification through a user interface on the client device;

detecting a re-ranking event comprising detecting a relocation event;

accessing updated contextual data describing an updated state of the user;

calculating a new interaction probability for the new notification by analyzing the updated contextual data;

determining that a user-specific new interaction probability for the new notification exceeds the threshold interaction probability; and outputting the new notification to the user through the client device.

9. The method of claim 8, wherein the historical notification event data also describes interactions by multiple users with notifications communicated to the multiple users.

10. The method of claim 8, wherein the threshold interaction probability is specific to a first notification channel and a second notification channel is associated with a different threshold interaction probability.

11. The method of claim 8, wherein the re-ranking event also comprises receiving an additional notification.

12. The method of claim 8, wherein the re-ranking event also comprises an end of a meeting the user is scheduled to attend.

13. The method of claim 8, wherein the method further comprises:
training the machine-learning mechanism to calculate the user-specific interaction probability for the notification using the training data; and
storing the machine-learning mechanism in a computer storage after the training is performed.

14. One or more non-transitory computer storage media storing computer executable instructions, when executed by a computing device, causes the computing device to perform a method of brokering notifications on a client device, the method comprising:
receiving at a notification broker for a client device a plurality of notifications from multiple applications associated with a user of the client device;
accessing contextual data describing a current state of the user;
communicating the contextual data to a machine-learning mechanism trained using historical notification event data as training data, wherein the training data comprises a detected user interaction with a presented notification as a dependent variable and notification characteristics of the presented notification as an independent variable;
calculating, using the machine-learning mechanism, a user-specific interaction probability for each of the plurality of notifications by analyzing the contextual data, wherein the plurality of notifications have designated notification channels when received at the notification broker from the multiple applications, and wherein an individual channel for a notification is an input used by the machine-learning mechanism to calculate the user-specific interaction probability;
determining that a first set of notifications of the plurality of notifications exceeds a threshold interaction probability;
determining that a second set of notifications of the plurality of notifications does not exceed the threshold interaction probability;
holding the second set of notifications in a notification queue;
outputting the first set of notifications to the user through the client device;
detecting a re-ranking event comprising an end of a meeting the user is scheduled to attend;
accessing updated contextual data describing an updated state of the user;
calculating a new interaction probability for notifications from the second set of notifications being held in the notification queue by analyzing the updated contextual data;
determining that a third set of notifications from the second set of notifications exceeds the threshold interaction probability; and
outputting the third set of notifications to the user through the client device.

15. The one or more non-transitory computer storage media of claim 14, wherein the historical notification event data describes interactions by the user with notifications communicated to the user.

16. The one or more non-transitory computer storage media of claim 14, wherein the historical notification event data describes interactions by multiple users with notifications communicated to the multiple users.

17. The one or more non-transitory computer storage media of claim 14, further comprising, prior to said outputting, determining that an amount of notifications in the first set of notifications is less than a threshold notification limit for a time period.

18. The one or more non-transitory computer storage media of claim 14, wherein the re-ranking event also comprises receiving a new notification at the notification broker.

19. The one or more non-transitory computer storage media of claim 14, wherein the re-ranking event also comprises a designated amount of time elapsing after said outputting.

* * * * *